(12) United States Patent
Samuel et al.

(10) Patent No.: US 11,030,047 B2
(45) Date of Patent: Jun. 8, 2021

(54) INFORMATION HANDLING SYSTEM AND METHOD TO RESTORE SYSTEM FIRMWARE TO A SELECTED RESTORE POINT

(71) Applicant: DELL PRODUCTS L.P., Round Rock, TX (US)

(72) Inventors: Balasingh Samuel, Round Rock, TX (US); Alok Pant, Austin, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 16/399,110

(22) Filed: Apr. 30, 2019

(65) Prior Publication Data

US 2020/0349009 A1 Nov. 5, 2020

(51) Int. Cl.
*G06F 11/00* (2006.01)
*G06F 11/14* (2006.01)
*G06F 9/4401* (2018.01)
*G06F 11/22* (2006.01)

(52) U.S. Cl.
CPC ........ *G06F 11/1438* (2013.01); *G06F 9/4406* (2013.01); *G06F 11/1441* (2013.01); *G06F 11/1446* (2013.01); *G06F 11/1461* (2013.01); *G06F 11/1469* (2013.01); *G06F 11/2289* (2013.01)

(58) Field of Classification Search
CPC ............. G06F 11/1441; G06F 11/1446; G06F 11/1469; G06F 11/1417; G06F 11/2289; G06F 9/4406
See application file for complete search history.

(56) References Cited

U.S. PATENT DOCUMENTS 7,577,829 B2 * 8/2009 Dennis ................ G06F 11/1417
713/1
10,797,952 B1 * 10/2020 Mills ................... H04L 41/0893
(Continued)

OTHER PUBLICATIONS

Wikipedia, "System Restore", Captured from Internet Apr. 17, 2019, 7 pgs.
(Continued)

*Primary Examiner* — Marc Duncan
(74) *Attorney, Agent, or Firm* — Egan, Enders & Huston LLP.

(57) ABSTRACT

Embodiments of information handling systems (IHS) and computer implemented methods are disclosed herein to restore system firmware to a selected restore point. In one embodiment, the IHS may include a computer readable non-volatile memory configured to store system firmware, a computer readable storage device configured to store an operating system (OS), a system registry, and an OS restore application, and a processing device configured to execute program instructions within the OS restore application to restore the system registry to a selected restore point and reboot the IHS. As the IHS is in the process of being rebooted, the processing device may execute program instructions within a firmware restore application stored within the computer readable non-volatile memory or the computer readable storage device to restore the system firmware to the selected restore point.

20 Claims, 7 Drawing Sheets

(56) References Cited

U.S. PATENT DOCUMENTS

2008/0320110 A1\* 12/2008 Pathak ................ G06F 11/1433
709/220
2011/0016093 A1\* 1/2011 Clark .................. G06F 11/1453
707/676
2013/0262849 A1\* 10/2013 Redheendran ...... G06F 9/44505
713/100

OTHER PUBLICATIONS

Windows, "Windows Platform Binary Table" (WPBT), Jul. 2015, 12 pgs.
Hoffman, "Zombie Crapware: How the Windows Platform Binary Table Works", How to Geek, Aug. 2015, 8 pgs.

\* cited by examiner

INFORMATION HANDLING SYSTEM AND METHOD TO RESTORE SYSTEM FIRMWARE TO A SELECTED RESTORE POINT

FIELD

This invention relates generally to information handling systems (IHSs), and more particularly, to hardware, software and/or firmware components of an IHS and related methods for restoring system firmware components to a selected restore point.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include boot firmware such as, for example, a Basic Input/Output System (BIOS) or Unified Extensible Firmware Interface (UEFI) that operates to initialize hardware components during the boot process and to provide runtime services for operating systems and application programs. Upon system start-up or reboot, a processing device (such as a central processing device, CPU, or an embedded controller, EC) may execute program instructions within the boot firmware to test and initialize the IHS hardware components, perform a Power-On Self-Test (POST) to ensure the hardware configuration is valid and working properly, load an operating system (OS) from a computer readable storage device, and/or perform a variety of other actions known in the art.

Some information handling systems use an operating system restore application to automatically monitor and record key system changes, as changes are made to system hardware and/or software. For example, the Microsoft Windows System Restore application automatically monitors and records changes and updates made to the Windows operating system (OS) files, applications, drivers and data, as well as changes made to the Windows system registry. The Windows System Restore application also creates system "restore points" automatically (e.g., when the OS is updated or new software, applications or drivers are installed), periodically (e.g., every x number of hours, or every x number of days), or manually upon the user's command. Each restore point includes a snapshot of important OS system files, applications, drivers and the system registry at a particular date and time. In some operating systems (e.g., Windows Vista and later), each restore point may include a snapshot of the entire drive or volume being monitored (i.e., a volume shadow copy).

A user or administrator of an information handling system may use the Windows System Restore application to recover from system malfunctions or other problems. For example, the Windows System Restore application may be used to restore the operating system to a previous state by selecting a previous restore point. When a restore point is selected, the Windows System Restore application reverts the operating system files, applications, drivers and system registry back to the state they were in when the restore point was created, and undoes any changes made to the system after the selected restore point.

One problem with the Windows System Restore application is that it is currently limited to monitoring and restoring operating system (OS) files, applications, drivers and the system registry. In its current state, the Windows System Restore application is not able to monitor and restore system firmware (e.g., boot firmware and/or other system firmware) and/or firmware configuration settings to a previously stored restore point.

SUMMARY OF THE INVENTION

The following description of various embodiments of information handling systems and related methods is not to be construed in any way as limiting the subject matter of the appended claims.

In the present disclosure, various embodiments of information handling systems and methods are provided herein for monitoring and restoring system firmware (e.g., boot firmware and/or other system firmware) and/or system firmware configuration settings to a previously stored restore point. According to one embodiment, an information handling system (IHS) provided herein may generally include a computer readable non-volatile (NV) memory (e.g., Flash memory or non-volatile random access memory, NVRAM), a computer readable storage device (e.g., a HDD or SSD), and a processing device (e.g., a host processor). The computer readable NV memory may be generally configured to store system firmware (e.g., boot firmware in addition to other system firmware), while the computer readable storage device may be generally configured to store an operating system (OS), a system registry and an OS restore application. The OS restore application may be generally configured to monitor and restore OS software and data stored within the computer readable storage device to a selected one of a plurality of restore points.

Unlike conventional IHSs, the IHS described herein may include a firmware restore application, which is configured to monitor changes made to the system firmware (e.g., updates made to the system firmware and/or changes made to the system firmware configuration settings) over time. If the OS restore application is initiated and a restore point is selected, the firmware restore application disclosed herein may be optionally configured to restore the system firmware and/or the system firmware configuration settings to the selected restore point. In some embodiments, the firmware restore application may be included within the operating system image stored within the computer readable storage device. In other embodiments, the firmware restore application may be included within a table (e.g., a Windows Platform Binary Table, WPBT), which is stored within the computer readable non-volatile memory.

In some cases, the processing device may execute program instructions within the OS restore application to restore the system registry to a selected restore point and reboot the IHS. As the IHS is in the process of being rebooted, the processing device may execute program instructions within the firmware restore application to restore the system firmware to the selected restore point.

Prior to executing the program instructions within the OS restore application, information about the system firmware (e.g., a system firmware version number and a plurality of configuration settings) may be stored within the system registry as firmware registry data, and a copy of the firmware registry data may be stored within the computer readable storage device. In some embodiments, the firmware registry data may be stored within the system registry and the copy of the firmware registry data may be stored within the computer readable storage device during the first system boot (i.e., the first time a new IHS is booted to the OS).

In other embodiments, the system firmware version number and the plurality of configuration settings may be added to a binary file and stored within the computer readable storage device. During first system boot, the system firmware version number and the plurality of configuration settings may be added to the system registry as firmware registry data, and the copy of the firmware registry data may be stored within the computer readable storage device.

Prior to executing the program instructions within the OS restore application, the processing device of the IHS may execute a first set of program instructions within the firmware restore application to monitor updates made to the system firmware and changes made to the configuration settings over time. For example, the processing device may execute the first set of program instructions within the firmware restore application to detect updates made to the system firmware and/or changes made to one or more of the configuration settings, and may update the firmware registry data stored within the system registry and the copy of the firmware registry data stored within the computer readable storage device to include the detected updates and/or changes. In some embodiments, updates made to the system firmware and/or changes made to one or more of the configuration settings may be detected by detecting information about the system firmware each time the IHS is rebooted, and by comparing the information detected about the system firmware at each system boot to the information contained within the copy of the firmware registry data stored within the computer readable storage device.

If the OS restore application is initiated and a restore point is selected, the processing device may execute a second set of program instructions within the firmware restore application, as the IHS is in the process of being rebooted, to compare the copy of the firmware registry data stored within the computer readable storage device to firmware registry data contained within the restored system registry to detect changes in the system firmware version number and/or configuration settings. If changes in the system firmware version number and/or configuration settings are detected, the processing device may execute a third set of program instructions within the firmware restore application to restore the system firmware to the selected restore point by restoring the system firmware and/or configuration settings to the firmware registry data contained within the restored system registry.

In some embodiments, the processing device may execute a fourth set of program instructions within the firmware restore application to provide the option to restore the system firmware or ignore firmware restoration before the system firmware is restored to the selected restore point. In one embodiment, the processing device may execute the fourth set of program instructions to display a message prompting a user to choose whether to restore the system firmware or ignore firmware restoration. In another embodiment, the processing device may execute the fourth set of program instructions to execute a predetermined policy to restore the system firmware or ignore firmware restoration. In yet another embodiment, the processing device may execute the fourth set of program instructions to restore the system firmware or ignore firmware restoration according to a setup option, which was previously selected to enable or disable firmware restoration.

According to another embodiment, a computer-implemented method is provided herein to monitor and restore system firmware to a selected restore point. The computer-implemented method may be performed by a processing device of an information handling system (IHS) executing program instructions (e.g., a firmware restore application) stored within a computer readable non-volatile memory or a computer readable storage device of the IHS. As noted above, a system registry containing firmware registry data (e.g., a system firmware version number and a plurality of configuration settings) and a copy of the firmware registry data may also be stored within the computer readable storage device.

In general, the method may include executing a first set of program instructions to update the firmware registry data stored within the system registry and the copy of the firmware registry data stored within the computer readable storage device when changes are made to system firmware. When the system registry is restored to a selected restore point and the IHS is rebooted, the method may further include executing a second set of program instructions to restore the system firmware to the selected restore point.

In some embodiments, the method may execute the first set of program instructions to detect updates made to the system firmware and/or changes made to one or more of the configuration settings, and to update the firmware registry data stored within the system registry and the copy of the firmware registry data stored within the computer readable storage device to include the detected updates and/or changes. In some embodiments, the method may detect information about the system firmware each time the IHS is rebooted, and compare the detected information about the system firmware to the copy of the firmware registry data stored within the computer readable storage device to detect updates made to the system firmware and/or changes made to the configuration settings.

As the IHS is in the process of being rebooted, the method may execute the second set of program instructions to compare the copy of the firmware registry data stored within the computer readable storage device to firmware registry data contained within the restored system registry to detect changes in the system firmware version number and/or configuration settings stored therein. If changes in the system firmware version number and/or configuration settings are detected, the method may execute the second set of program instructions to restore the system firmware to the selected restore point by restoring the system firmware and/or configuration settings to the firmware registry data contained within the restored system registry.

In some embodiments, the method may execute a third set of program instructions to provide the option to restore the system firmware or ignore firmware restoration before restoring the system firmware to the selected restore point. In one embodiment, the method may execute the third set of program instructions to display a message prompting a user to choose whether to restore the system firmware or ignore firmware restoration. In another embodiment, the method may execute the third set of program instructions to execute a predetermined policy to restore the system firmware or ignore firmware restoration. In yet another embodiment, the method may execute the third set of program instructions to restore the system firmware or ignore firmware restoration according to a setup option, which was previously selected to enable or disable firmware restoration.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 1:
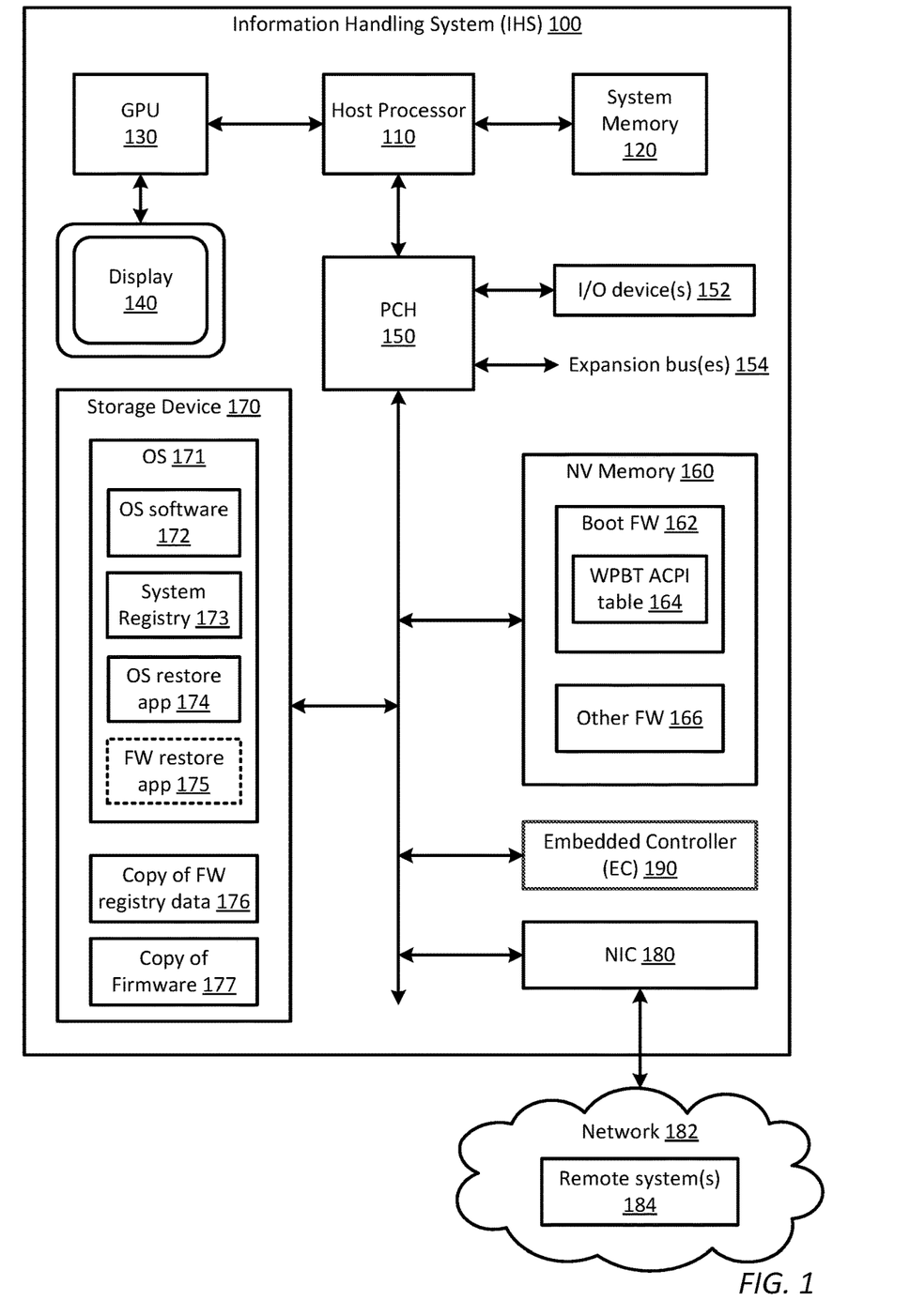
FIG. 1 is a block diagram illustrating one embodiment of an information handling system (IHS) according to one embodiment of the present disclosure.

FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 may generally include at least one processing device 110 (e.g., a host processor), a system memory 120, a graphics processor unit (GPU) 130, a display device 140, a platform controller hub (PCH) 150, input/output (I/O) devices 152, expansion bus(es) 154, a computer readable non-volatile (NV) memory 160, a computer readable storage device 170, a network interface card (NIC) 180 and an embedded controller (EC) 190.

It is expressly noted that the IHS configuration shown in FIG. 1 is exemplary only, and that the methods disclosed herein may be implemented on any type and/or configuration of information handling system having one or more processing devices, a computer readable non-volatile memory, and a computer readable storage device. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images (e.g., a graphical user interface, messages and/or user prompts) to the user. In some embodiments, GPU 130 may be coupled to one or more display ports to support additional display functions. Although GPU 130 is shown as a separate processing device in the embodiment of FIG. 1, GPU 130 may be omitted in other embodiments, when the functionality provided thereby is integrated within host processor 110 in a system-on-chip (SoC) design. In some embodiments, IHS 100 may include other types of processing devices including, but not limited to, a graphics-derivative processor (such as a physics/gaming processor), a digital signal processor (DSP), etc.

Platform controller hub (PCH) 150 is coupled to host processor 110 and configured to handle I/O operations for the IHS. As such, PCH 150 may include a variety of communication interfaces and ports for communicating with various system components, such as input/output (I/O) devices 152, expansion bus(es) 154, computer readable NV memory 160, computer readable storage device 170, NIC 180 and EC 190. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt interface. Examples of expansion bus(es) 154 that may be coupled to PCH 150 include, but are not limited to, a PCI bus, a PCIe bus, a SATA bus, a USB bus, etc.

I/O devices 152 enable the user to interact with IHS 100 and software/firmware executing thereon. In some embodiments, one or more I/O devices 152 may be provided within IHS 100. In other embodiments, I/O device(s) 152 may be separate from the IHS and may interact with the IHS through a wired or wireless connection. Examples of I/O devices 152 include, but are not limited to, keyboards, keypads, touch screens, mice, scanning devices, voice or optical recognition devices, and any other devices suitable for entering or retrieving data.

Computer readable storage device 170 may be any type of persistent, non-transitory computer readable storage device, such as one or more hard disk drives (HDDs) or solid-state drives (SSDs), and may be generally configured to store software and/or data. For example, computer readable storage device 170 may be configured to store an operating system (OS) 171 for the IHS, in addition to other software and/or firmware modules and user data. As known in the art, OS 171 may contain program instructions (or computer program code), which may be executed by host processor 110 to perform various tasks and functions for the information handling system and/or for the user. In one embodiment, OS 171 may be one of the many Windows® operating systems provided by Microsoft.

OS 171 may generally include OS software 172, system registry 173 and OS restore application 174. OS software 172 includes operating system files, applications, services, hardware drivers, etc. System registry 173 stores information and settings for software programs, hardware devices, user preferences, operating system configurations, and much more. OS restore application 174 automatically monitors and records changes and updates made to OS software 172 and system registry 173, and creates a plurality of system restore points. As described in more detail below with regard to FIG. 3, a user or administrator of IHS 100 may utilize OS restore application 174 to restore the OS software 172 and system registry 173 to a selected one of the previously stored restore points.

Computer readable memory 160 may include any type of non-volatile (NV) memory including, but not limited to, Flash memory (e.g., SPI Flash memory) and non-volatile random-access memory (NVRAM), and may be generally configured to store software and/or firmware modules. The software and/or firmware modules stored within NV memory 160 may generally contain program instructions (or computer program code), which may be executed by host processor 110 to instruct components of IHS 100 to perform various tasks and functions for the information handling system.

In the embodiment shown in FIG. 1, computer readable NV memory 160 is configured to store boot firmware (FW) 162 and other system firmware 166. Examples of other system firmware 166 that may be stored within computer readable NV memory 160 include, but are not limited, a Flash Descriptor (FD), a Converged Security Management Engine (CSME), optional and/or extended boot firmware components, and firmware executed by EC 190 and/or other controllers, which may be included within the IHS. In some embodiments, one or more copies 177 of the system firmware (e.g., boot firmware 162 and/or other system firmware 166) stored within computer readable NV memory 160 may be stored within computer readable storage device 170. In other embodiments, one or more copies of the system firmware (e.g., boot firmware 162 and/or other system firmware 166) stored within computer readable NV memory 160 may additionally, or alternatively, be stored within a remotely located system 184 (e.g., a network connected server, or server cloud).

The boot firmware 162 stored within computer readable NV memory 160 may generally include software and/or firmware modules for specifying hardware configuration settings, system date/time, boot sequence, etc. In some embodiments, boot firmware 162 may be implemented as a Basic Input/Output System (BIOS) and/or a Unified Extensible Firmware Interface (UEFI). As known in the art, boot firmware 162 may include boot services and runtime services. Boot services are available for execution when the boot firmware owns the system platform during a pre-boot phase before the operating system (OS) is loaded and running. Runtime services, on the other hand, are available for execution while the OS is running (i.e., during OS runtime).

In some embodiments, a Windows Platform Binary Table (WPBT) 164 comprising a Windows application binary may be stored within boot firmware 162. If included, boot firmware 162 may load WPBT 164 into system memory 120 during the pre-boot phase. During OS runtime, OS 171 may read the WPBT 164 loaded into system memory 120, and may execute the Windows application binary contained therein to perform one or more steps of the methods shown in FIGS. 4-6. For example, OS 171 may execute the Windows application binary loaded into system memory 120 to monitor updates made to one or more system firmware components (e.g., boot firmware 162 and/or other system firmware 166) and/or changes made to the system firmware configuration settings. If OS restore application 174 is subsequently initiated to restore OS software 172 and system registry 173 to a selected restore point, OS 171 may further execute the Windows application binary to restore the one or more system firmware components (e.g., boot firmware 162 and/or other system firmware 166) and/or system firmware configuration settings to the selected restore point. For this reason, the Windows application binary included within WPBT 164 may be otherwise referred to herein as a "firmware restore application."

In one alternative embodiment of the present disclosure, the "firmware restore application" disclosed herein may be included within the OS image, instead of an WPBT 164 stored within the boot firmware region of computer readable NV memory 160. For example, and as shown in FIG. 1, firmware restore application 175 may be included within OS 171, and may be executed: automatically after a delayed start or manually in response to a trigger. One example of such an application is the proprietary Windows Service Application provided by Dell, Inc.

Similar to the previous embodiment, firmware restore application 175 may be loaded into system memory 120 during the pre-boot phase, and may be executed during OS runtime to monitor updates made to one or more system firmware components (e.g., boot firmware 162 and/or other system firmware 166) and/or changes made to the system firmware configuration settings. If OS restore application 174 is subsequently initiated to restore OS software 172 and system registry 173 to a selected restore point, firmware restore application 175 may be further executed to restore the system firmware and/or the system firmware configuration settings to the selected restore point.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet. NIC 180 may communicate data and signals to/from IHS 100 using any known communication protocol.

In some embodiments, IHS 100 may utilize NIC 180 to access and retrieve software/firmware from a remotely located system 184 (e.g., a network connected server, or server cloud). As noted above, for example, the remotely located system 184 may be configured to store copies of the system firmware components (e.g., boot firmware 162 and/or other system firmware 166) stored within NV memory 160. In some embodiments, access to the remotely located system 184 may be provided by a boot time network service executed in the pre-boot environment. In other embodiments, access to the remotely located system 184 may be provided by an Advanced Configuration and Power Interface (ACPI) runtime service (e.g., a WPBT ACPI agent) executed in the OS environment.

Embedded controller (EC) 190 is generally configured to boot the information handling system and perform other functions. EC 190 may generally include read only memory (ROM), random access memory (RAM) and a processing device (e.g., a controller, microcontroller, microprocessor, ASIC, etc.) for executing program instructions stored within its internal ROM and RAM. For example, EC 190 may be configured to execute program instructions (e.g., a boot block) stored within its internal ROM to initiate a boot process for the information handling system.

When IHS 100 is powered on or rebooted, the processing device of EC 190 may initiate a boot process for the information handling system by executing the boot block stored within the EC ROM while PCH 150 and host processor 110 are in reset. As used herein, an IHS "boot process" is a process or set of operations performed by an information handling system component (e.g., EC 190 and/or host processor 110) to load and execute a boot system (e.g., BIOS and/or UEFI) and prepare the system for OS booting. When the host processor comes out of reset, the host processor retrieves the boot firmware 162 from computer readable NV memory 160, stores a local copy of the boot firmware within system memory 120, and executes the boot firmware to configure hardware components of the IHS, perform a Power-On Self-Test (POST) to ensure the hardware configuration is valid and working properly, discover and initialize devices, and launch a bootloader to load OS 171. Once launched, the bootloader within boot firmware 162 retrieves OS 171 from computer readable storage device 170 and loads it into system memory 120.

Figure 2A:
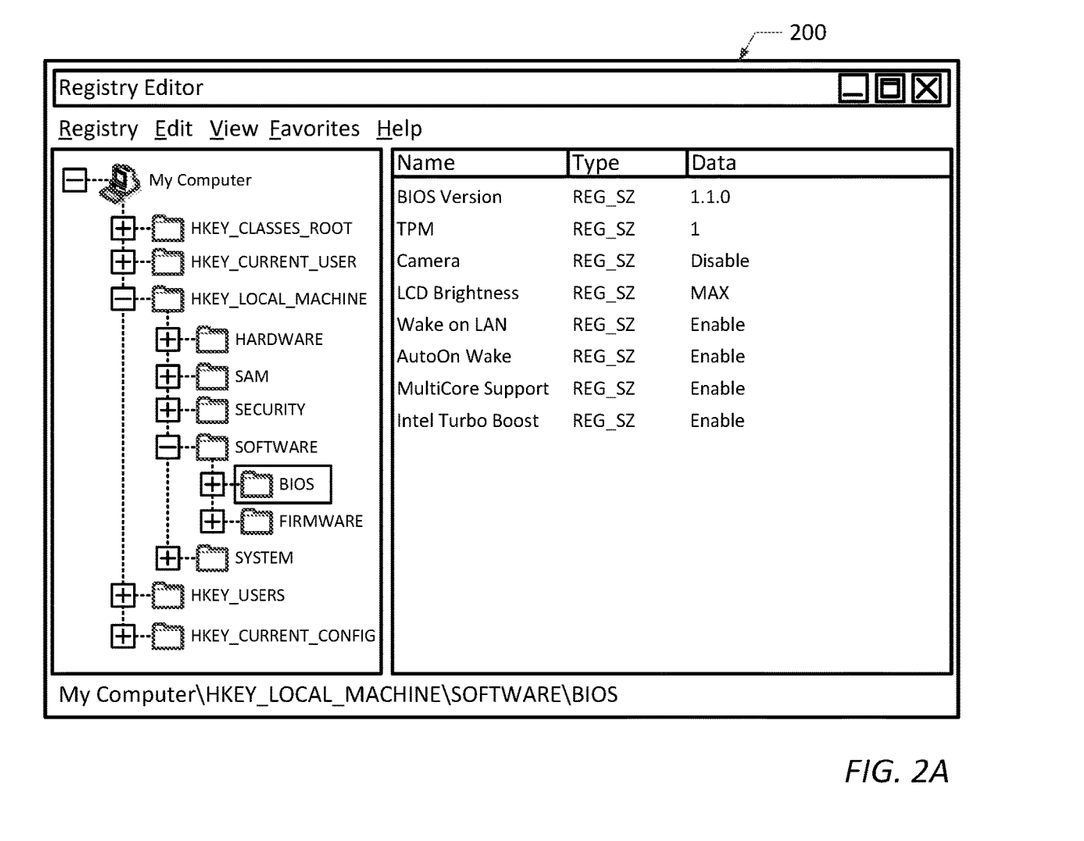
FIG. 2A illustrates an embodiment of a Registry Editor, which shows a system firmware (e.g., BIOS) version number and a plurality of system firmware configuration settings stored in the system registry.
Figure 2B:
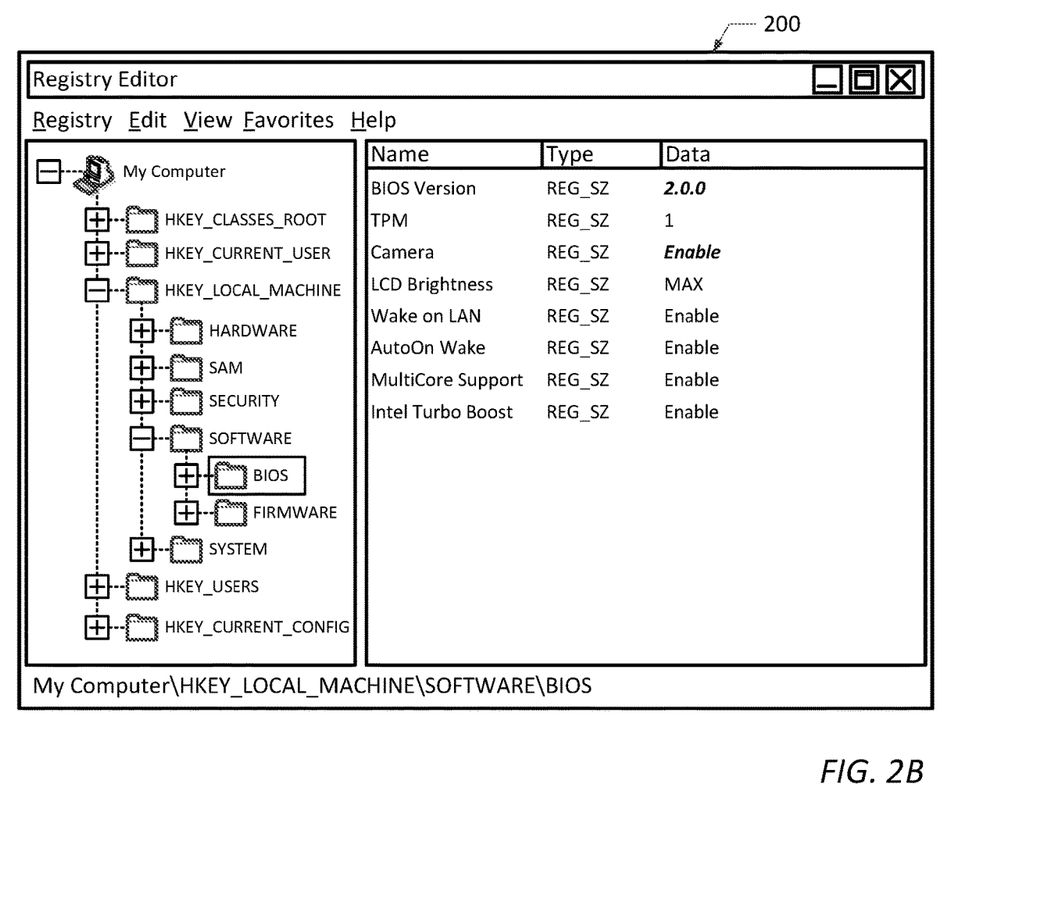
FIG. 2B illustrates another embodiment of a Registry Editor, which shows changes have been made to the system firmware version number and system firmware configuration settings stored in the system registry.

As noted above, OS 171 may generally include OS software 172, a system registry 173, an OS restore application 174 and in some embodiments a firmware restore application 175. System registry 173 stores information and settings for software programs, hardware devices, user preferences, operating system configurations, and much more. More specifically, system registry 173 is a hierarchical database of data that is critical to the operation of OS 171 and the OS system files, applications, services and hardware drivers that run in the OS environment. As shown in FIGS. 2A and 2B, the system registry 173 data is structured in a tree format. Each node in the tree is called a registry key (or simply "key"), and each registry key (a folder that contains more data) contains both subkeys and data entries (called values). In some operating systems, the system registry 173 may be accessed and configured using a Registry Editor program.

Registry Editor windows 200 are depicted in FIGS. 2A and 2B to illustrate exemplary registry keys (e.g., My Computer, HKEY_CLASSES_ROOT, HKEY_CURRENT_USER, HKEY_LOCAL_MACHINE, HKEY_USERS, HKEY_CURRENT_CONFIG) that may be included within system registry 173. As noted above, each of the registry keys depicted in FIGS. 2A and 2B may have one or more subkeys. For example, the HKEY_LOCAL_MACHINE key is depicted in FIGS. 2A and 2B as having the following subkeys: HARDWARE, SAM, SECURITY, SOFTWARE and SYSTEM. Each of these keys, in turn, may have one or more subkeys and/or data. Although not equivalent to system registry 173, the Registry Editor window 200 may be used to view and/or make changes to the system registry 173.

As shown in FIGS. 2A and 2B, and described in more detail below, one or more subkeys may be added to system registry 173 to store information about the system firmware (e.g., boot firmware 162 and/or other system firmware 166) stored within computer readable NV memory 160. In the example embodiment shown in FIGS. 2A and 2B, a "BIOS" subkey is appended to the system registry under the SOFTWARE subkey, and configured to store the current boot firmware version number (e.g., BIOS Version 1.1.0, FIG. 2A) and boot firmware configuration settings (e.g., TPM, 1; Camera, Disable; LCD Brightness, MAX; Wake on LAN, Enable; AutoOn Wake, Enable; MultiCore Support, Enable; Intel Turbo Boost, Enable). In some embodiments, another "FIRMWARE" subkey may be appended to the system registry under the SOFTWARE subkey to store the current firmware version number and firmware configuration settings for other system firmware 166 components.

As noted above, OS restore application 174 automatically monitors and records changes and updates made to OS software 172 and system registry 173, and creates a plurality of system restore points. The system restore points may be created automatically (e.g., when the OS is updated or new software, applications or drivers are installed), periodically (e.g., every x number of hours, or every x number of days), or manually upon the user's command. Although not strictly limited to such, OS restore application 174 may be the Windows System Restore application, in some embodiments.

Figure 3:
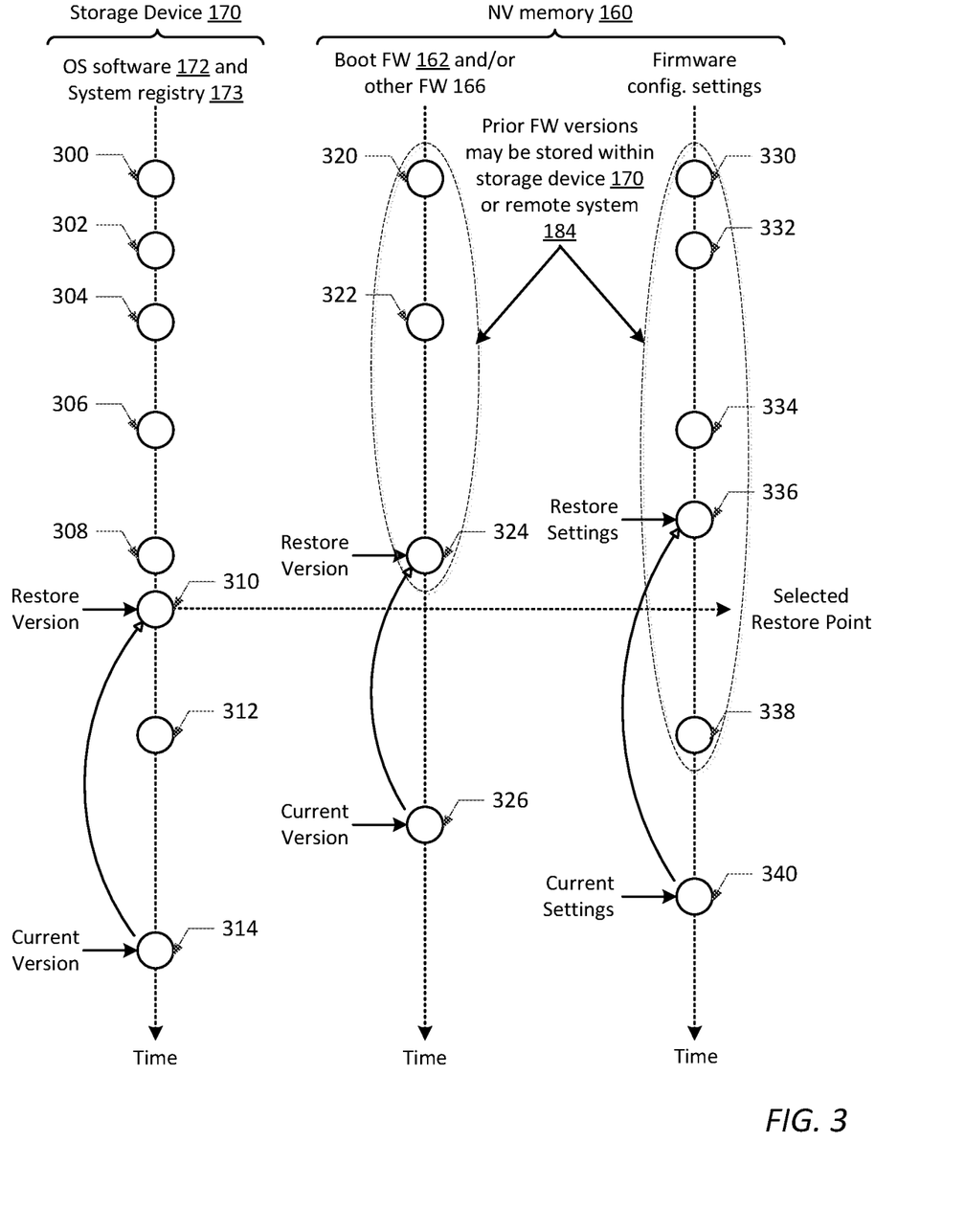
FIG. 3 is a diagram illustrating how embodiments of the present disclosure can be used to restore operating system (OS) software and data, system firmware and system firmware configuration settings to a selected restore point.

As shown in FIG. 3, OS restore application 174 creates and stores restore points (e.g., 300, 302, 304, 306, 308, 310, 312 and 314) over time for the OS software 172 and system registry 173 stored within computer readable storage device 170. Each restore point may generally include a snapshot of the OS software 172 and system registry 173 at a particular date and time. In some operating systems (e.g., Windows Vista and later), each restore point may include a snapshot of the entire drive or volume being monitored (i.e., a volume shadow copy).

In some cases, a user or administrator of IHS 100 may use OS restore application 174 to recover from system malfunctions or other problems. If problems occur in the current version (e.g., 314) of the operating system software, OS restore application 174 may be used to restore OS 171 to a previous state by selecting one of the previously stored restore points (e.g., 300, 302, 304, 306, 308, 310, or 312). When a restore point (e.g., restore point 310) is selected, OS restore application 174 reverts the OS software 172 (e.g., operating system files, applications, services, hardware drivers, etc.) and system registry 173 back to the state they were in when the selected restore point was created, and undoes any changes made to the OS software 172 and system registry 173 after the selected restore point.

Although OS restore application 174 may be used to monitor and restore OS software 172 and system registry 173 to a selected restore point, it is not configured to monitor and restore system firmware components (e.g., boot firmware 162 and/or other system firmware 166) or system firmware configuration settings to the selected restore point. Prior to the development of the improved information handling systems and methods described herein, a user or administrator of a conventional system was required to manually track and restore system firmware and configuration settings. This was a tedious process, which was often ignored by the average user.

Generally speaking, the present disclosure provides embodiments of improved information handling systems and methods to monitor and restore system firmware and/or system firmware configuration settings to a selected restore point. One embodiment of such an information handling system 100 is shown in FIG. 1. As noted above, IHS 100 may generally include a computer readable NV memory 160, a computer readable storage device 170, and a processing device (e.g., a host processor) 110, in addition to other hardware, software and firmware components. Computer readable NV memory 160 may be generally configured to store system firmware, such as boot firmware 162 (e.g., BIOS and/or UEFI) and other system firmware 166. Computer readable storage device 170 may be generally configured to store an operating system (OS) 171, including OS software 172, a system registry 173 and an OS restore application 174. As noted above, the OS restore application 174 may be configured to monitor and restore the OS software 172 and system registry 173 to a restore point selected, e.g., by a user or administrator.

Unlike conventional systems and methods, IHS 100 includes a firmware restore application, which can be executed by host processor 110 during OS runtime to monitor updates made to the system firmware and/or changes made to system firmware configuration settings. In some embodiments, the firmware restore application disclosed herein may be a Windows application binary, which is included within the WPBT 164 stored within the boot firmware 162 region of computer readable NV memory 160. In other embodiments, the firmware restore application 175 disclosed herein may be included within the OS 171 image stored within computer readable storage device 170.

The firmware restore application disclosed herein maintains information about the system firmware (i.e., firmware registry data) in system registry 173, and stores a copy of the firmware registry data 176 in computer readable storage device 170 (as shown in FIG. 1) or in the memory of its own application. In some embodiments, the firmware registry data stored within system registry 173 and the copy of the firmware registry data 176 stored within computer readable storage device 170 may include a system firmware version number and one or more system firmware configuration settings. As shown in FIG. 2A, for example, the firmware registry data stored in system registry 173 and the copy of the firmware registry data 176 may each include a boot firmware version number (e.g., BIOS Version 1.1.0) and a plurality of boot firmware configuration settings (e.g., TPM, 1; Camera, Disable; LCD Brightness, MAX; Wake on LAN, Enable; AutoOn Wake, Enable; MultiCore Support, Enable; Intel Turbo Boost, Enable).

When the system firmware is updated or changes are made to the system firmware configuration settings, boot firmware 172 captures the updates/changes made to the system firmware at every system boot, and stores the updates/changes in computer readable NV memory 160 (or alternatively, in computer readable storage device 170). The firmware restore application disclosed herein compares the copy of the firmware registry data 176 stored within computer readable storage device 170 to the system firmware version number and configuration settings captured by the boot firmware 172 at the last system boot to detect changes in the system firmware version number and/or configuration settings. If changes in the system firmware version number and/or configuration settings are detected, the firmware restore application updates the firmware registry data stored in system registry 173 and the copy of the firmware registry data 176 stored in computer readable storage device 170 to include the detected changes. For example, the firmware restore application may update the firmware registry data stored in system registry 173 and the copy of the firmware registry data 176 stored in computer readable storage device 170 to include the changes detected in the boot firmware version number (e.g., BIOS Version 2.0.0) and the "Camera" configuration setting ("Enable"), as shown in the comparison of FIGS. 2A and 2B.

If OS restore application 174 is initiated and a restore point is selected, the firmware restore application disclosed herein may restore the system firmware and/or system firmware configuration settings to the selected restore point. When restoring the system, the OS restore application 174 replaces the current system registry 173 with one that was saved for the selected restore point and reboots the system to complete the system restoration process. During the reboot process, the firmware restore application compares the last firmware version number and configuration settings stored by the firmware restore application (e.g., the copy of the firmware registry data 176 stored in computer readable storage device 170 or in the memory of its own application) to the firmware version number and configuration settings in the restored system registry 173 to detect changes in the system firmware version number and/or configuration settings. If changes are detected, the firmware restore application restores the system firmware and/or the system firmware configuration settings to the firmware version number and/or configuration settings specified in the restored system registry. In some cases, the firmware restore application may provide an option to restore the system firmware or ignore firmware restoration.

Figure 4:
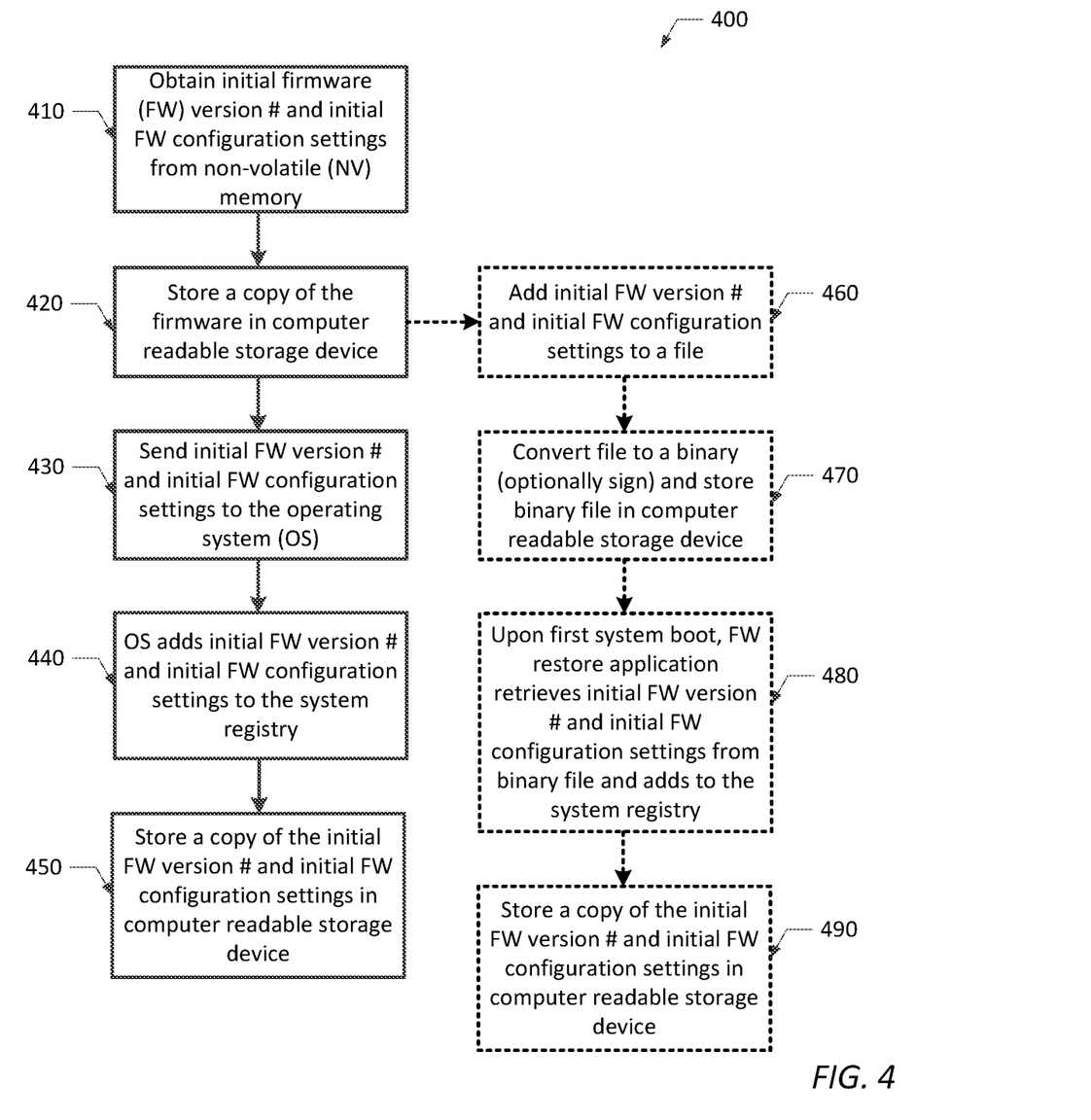
FIG. 4 is a flowchart diagram illustrating various embodiments of a method that may be performed to add an initial system firmware version number and initial system firmware configuration settings to the system registry.
Figure 5:
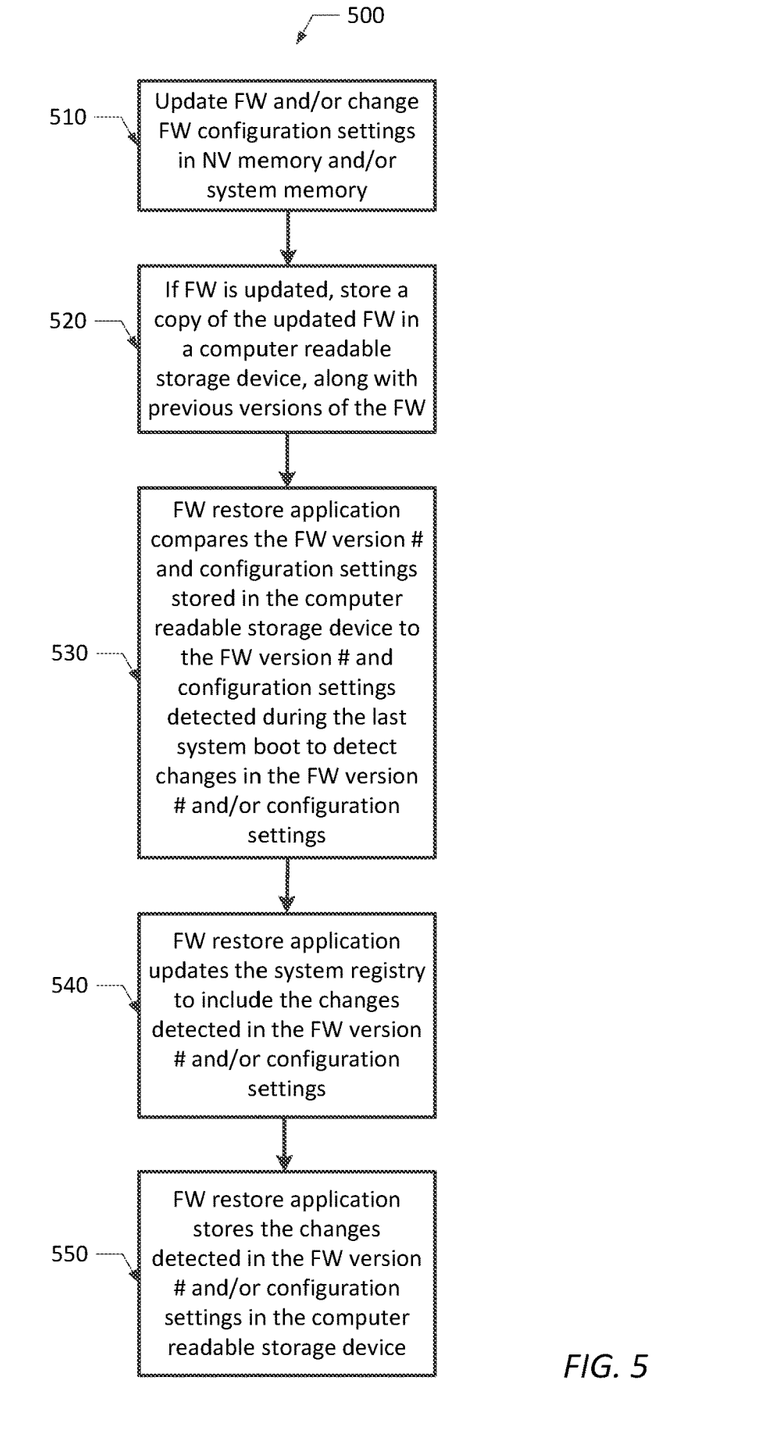
FIG. 5 is a flowchart diagram illustrating one embodiment of a method that may be performed to monitor updates made to the system firmware and/or changes made to the system firmware configuration settings.
Figure 6:
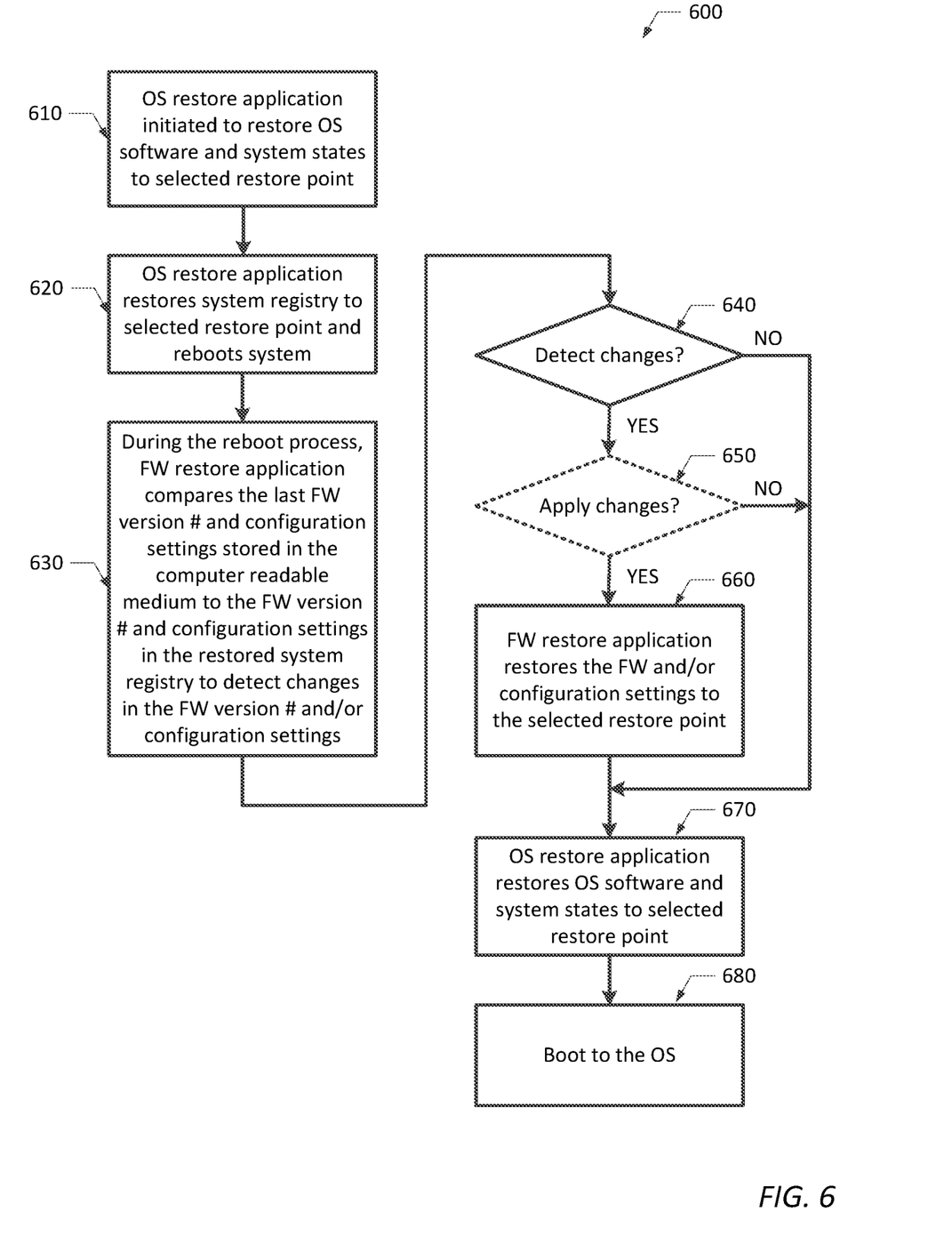
FIG. 6 is a flowchart diagram illustrating one embodiment of a method that may be performed to restore OS software and data, and optionally restore system firmware and/or system firmware configuration settings, to a selected restore point.

FIGS. 4-6 illustrate various embodiments of methods that may be performed by hardware, software and/or firmware components of an information handling system (IHS) to monitor and restore system firmware and/or system firmware configuration settings to a selected restore point. The methods shown in FIGS. 4-6 are computer implemented methods performed, at least in part, by a processing device (e.g., host processor 110) of an information handling system (e.g., IHS 100) executing program instructions (e.g., boot firmware 162, OS restore application 174, and the firmware restore application disclosed herein) stored within a computer readable memory (e.g., computer readable NV memory 160) and a computer readable storage device (e.g., computer readable storage device 170) of the IHS. Unlike conventional information handling systems and methods, the computer implemented methods shown in FIGS. 4-6 may be used to improve the way in which an information handling system functions, in one respect, by automatically restoring system firmware and/or firmware configuration settings to the same restore point used by OS restore application 174, thereby avoiding the need for a user or administrator to manually track and restore the system firmware and/or firmware configuration settings after a system restore is performed.

FIG. 4 is a flowchart diagram illustrating various embodiments of a method 400 that may be performed to add an initial firmware version number and initial firmware configuration settings to the system registry 173. As shown in FIG. 4, one embodiment of method 400 may begin (in step 410) when a computer readable non-volatile memory (e.g., NV memory 160) is accessed to obtain an initial firmware version number and initial firmware configuration settings for one or more system firmware components stored therein. As shown in FIG. 1, for example, computer readable NV memory 160 may include boot firmware 162 (e.g., BIOS and/or UEFI) and other system firmware 166 components (e.g., an EC region, CSME region, optional and/or extended boot firmware components, and firmware executed by other controllers included within the IHS). In some embodiments, method step 410 may obtain the initial version number and initial configuration settings for only boot firmware 162. In other embodiments, method step 410 may obtain the initial version number and initial configuration settings for one or more of the system firmware components stored within NV memory 160.

For each system firmware component to be monitored, method 400 stores a copy of the system firmware (e.g., copy of firmware 177) in a computer readable storage device (e.g., computer readable storage device 170) of the information handling system (in step 420). In some embodiments, the copy of the system firmware 177 may be stored within an Extensible Firmware Interface system partition (ESP) of the computer readable storage device (in step 420). Alternatively, a copy of the system firmware may be stored or maintained within a remotely located system (e.g., remote system 184), which is assessable to the information handling system via a wired or wireless network (e.g., network 182).

In some embodiments, method 400 may send the initial firmware version number and initial firmware configuration settings obtained in step 410 to the operating system (e.g., OS 171) of the information handling system (in step 430), so that the OS can add the initial firmware version number and initial firmware configuration settings (i.e., firmware registry data) to the system registry (e.g., system registry 173) in step 440. In step 450, method 400 stores a copy of the initial firmware version number and initial firmware configuration settings (e.g., copy of firmware registry data 176) within the computer readable storage device.

Method steps 410-450 may be performed during the first system boot (i.e., the first time a new IHS is booted to the OS) to store the initial firmware version number(s) and initial firmware configuration settings within the system registry. Method steps 410, 420 and 460-490 represent an alternative embodiment of the method 400 disclosed above.

In the alternative embodiment of method 400, the initial firmware version number and initial firmware configuration settings obtained in step 410 may be added to a file (in step 460), instead of being sent to the OS in step 430. In step 470, the file is converted to a binary and stored within the computer readable storage device. In some embodiments, the binary may be stored within an ESP partition of the computer readable storage device (in step 470). In some embodiments, the binary may be optionally signed with an asymmetric key pair to prevent tampering (in step 470). During the first system boot, the firmware restore application disclosed herein may retrieve the initial firmware version number(s) and initial firmware configuration settings from the binary file and add them to the system registry (e.g., system registry 173) in step 480. In step 490, the firmware restore application may store a copy of the initial firmware version number and initial firmware configuration settings (e.g., copy of firmware registry data 176) within the computer readable storage device.

In some embodiments, the initial firmware registry data stored in the system registry (in steps 440 and 480) and the copy of the initial firmware registry data stored within the computer readable storage device (in steps 450 and 490) may include an initial boot firmware version number (e.g., BIOS Version 1.1.0) and initial boot firmware configuration settings (e.g., TPM, 1; Camera, Disable; LCD Brightness, MAX; Wake on LAN, Enable; AutoOn Wake, Enable; MultiCore Support, Enable; Intel Turbo Boost, Enable), as described above and shown in FIG. 2A. In other embodiments, the initial firmware registry data stored in the system registry (in steps 440 and 480) and the copy of the initial firmware registry data stored within the computer readable storage device (in steps 450 and 490) may include an initial firmware version number and initial firmware configuration settings for other system firmware (e.g., other system firmware 166).

FIG. 5 is a flowchart diagram illustrating one embodiment of a method 500 that may be performed to monitor updates to the system firmware and/or changes made to the system firmware configuration settings. As shown in FIG. 5, method 500 may generally begin (in step 510) when the system firmware stored within a computer readable non-volatile memory (e.g., computer readable NV memory 160) of an information handling system (IHS) is updated, or changes are made to the system firmware configuration settings. As noted above and shown in FIG. 1, the system firmware components stored within computer readable NV memory 160 may include boot firmware 162 (e.g., BIOS and/or UEFI) and other system firmware 166 (e.g., an EC region, CSME region, optional and/or extended boot firmware components, and firmware executed by other controllers included within the IHS).

As shown in FIG. 3, the system firmware components (e.g., boot firmware 162 and other system firmware 166) stored within the computer readable non-volatile memory may be updated over time, and/or changes may be made to the configuration settings of the system firmware components. For example, initial version(s) 320 of boot firmware 162 and/or other system firmware 166 may be stored within NV memory 160. Likewise, initial configuration settings 330 for the system firmware (e.g., boot firmware 162 and/or other system firmware 166) may also be stored within NV memory 160. Over time, the system firmware may be updated and/or changes may be made to the system firmware configuration settings. Reference numbers 322, 324, and 326 represent updates made to the system firmware, while reference numbers 332, 334, 336, 338 and 340 represent changes made to the firmware configuration settings.

When the system firmware is updated or changes are made to the system firmware configuration settings, boot firmware 172 captures the updates/changes made to the system firmware at every system boot and stores the updates/changes, for example, within the computer readable NV memory. Alternatively, boot firmware 172 may store the captured updates/changes made to the system firmware within an ESP partition of a computer readable storage device (e.g., computer readable storage device 170) of the information handling system, or another computer readable memory or storage device of the IHS.

If the system firmware is updated (in step 510), method 500 may store a copy of the updated system firmware (e.g., copy of firmware 177) within a computer readable storage device (e.g., computer readable storage device 170) of the information handling system (in step 520), in some embodiments. In one example implementation, boot firmware 162 may store a copy of the updated system firmware within the ESP partition of the computer readable storage device, along with one or more previous versions of the system firmware (in step 520). In another example implementation, a firmware deployment service (e.g., a desktop application) may store a copy of the updated system firmware, along with one or more previous versions of the system firmware, within the ESP partition of the computer readable storage device or another storage device (in step 520). Alternatively, the copy of the updated system firmware and/or previous versions of the system firmware may be stored or maintained (in step 520) within a remotely located system (e.g., remote system 184), which is assessable to the information handling system via a wired or wireless network (e.g., network 182).

In step 530, method 500 compares the firmware version number and configuration settings (e.g., the copy of the firmware registry data 176) stored within the computer readable storage device to the firmware version number and configuration settings stored captured by the boot firmware at the last system boot to detect changes in the firmware version number and/or configuration settings. In step 540, method 500 updates the firmware registry data stored in the system registry (e.g., system registry 173) to include the changes detected in the firmware version number and/or configuration settings. In step 550, method 500 stores the changes detected in the firmware version number and/or configuration settings within the computer readable storage device (e.g., within firmware registry data 176). In some embodiments, method steps 530-550 may be performed by the firmware restore application disclosed herein.

In some embodiments, the updated firmware registry data stored in the system registry (in step 540) and the copy of the updated firmware registry data stored within the computer readable storage device (in step 550) may include changes detected (in step 530) in the boot firmware version number and/or boot firmware configuration settings. As shown in the comparison of FIGS. 2A and 2B, for example, changes in the boot firmware version number (e.g., BIOS Version number changed from 1.1.0 to 2.0.0) and/or changes in one or more boot firmware configuration settings (e.g., the "Camera" setting changed from "Disable" to "Enable") may be updated in the system registry (in step 540) and stored within the computer readable storage device (in step 550). In some embodiments, only the changes made in step 510 and detected in step 530 (e.g., BIOS Version number and Camera setting) are updated in the system registry (in step 540) and stored within the computer readable storage device (in step 550).

FIG. 6 is a flowchart diagram illustrating one embodiment of a method that may be performed to restore OS software and data, and to (optionally) restore system firmware and/or system firmware configuration settings, to a selected restore point. As shown in FIG. 6, method 600 may generally begin (in step 610) when an operating system restore application (e.g., OS restore application 174) is initiated to restore OS software and system states to a selected restore point. When restoring the system, the OS restore application 174 restores the system registry 173 to the selected restore point and reboots the system to complete the system restoration process (in step 620). In the diagram shown in FIG. 3, for example, the OS restore application 174 may replace the current version 314 of the system registry with a prior version 310 of the system registry, which was stored at a previous date and time corresponding to the selected restore point. Once the system registry is restored to the selected restore point, the system is rebooted to complete the system restoration process.

During the reboot process, method 600 compares the copy of the firmware registry data 176 stored within the computer readable storage device 170 to the firmware registry data contained in the restored system registry 173 to detect changes in the firmware version number and/or configuration settings (in step 630). More specifically, method 600 compares the last firmware version number and configuration settings stored within computer readable storage device 170 to the firmware version number and configuration settings contained in the restored system registry to detect changes in the firmware version number and/or configuration settings (in step 630). If no changes are detected (NO branch of step 640), the OS restore application restores the OS software (e.g., OS software 172) and system states to the selected restore point (in step 670) and boots to the OS (in step 680).

If changes are detected (YES branch of step 640), method 600 may restore the system firmware and/or the system firmware configuration settings to the selected restore point (in step 660) by restoring the system firmware and/or configuration settings to the firmware registry data contained within the restored system registry. More specifically, method 600 may restore the system firmware and/or the system firmware configuration settings to the firmware version number and/or configuration settings specified in the restored system registry (in step 660). In the diagram shown in FIG. 3, for example, method step 660 may replace a current version 326 of system firmware (e.g., boot firmware 162 and/or other system firmware 166) with a previous version 324 of the system firmware, which was stored at, or prior to, the selected restore point. In addition, method step 660 may replace current system firmware configuration settings 340 with previous system firmware configuration settings 336, which were stored at, or prior to, the selected restore point.

In some embodiments, method 600 may provide an option (in optional step 650) to apply the changes detected in steps 630 and restore the system firmware and/or configuration settings in step 660, or ignore the detected changes and forgo firmware restoration. In one example, method step 650 may display a message prompting a user or administrator to choose whether to restore the system firmware or ignore firmware restoration. In another example, method step 650 may execute a predetermined policy to restore the system firmware or ignore firmware restoration. In another example, method step 650 restore the system firmware or ignore firmware restoration according to a setup option, which was previously selected by a user or administrator to enable or disable firmware restoration.

If the user or administrator chooses to apply the changes (YES branch of optional step 650), the system firmware and/or the system firmware configuration settings are restored to the selected restore point (in step 660), the OS software (e.g., OS software 172) is restored to the selected restore point (in step 670) and the OS is booted (in step 680). If the user or administrator chooses not to apply the changes (NO branch of optional step 650), the OS software (e.g., OS software 172) is restored to the selected restore point (in step 670) and the OS is booted (in step 680) without restoring the system firmware and/or the system firmware configuration settings.

In some embodiments, method steps 630-660 may be performed by the firmware restore application disclosed herein. In other embodiments, the firmware restore application disclosed herein may only perform method steps 630-650 of FIG. 6. Instead of restoring the system firmware and/or firmware configuration changes in step 660, an alternative embodiment of the firmware restore application disclosed herein may send the system firmware version number and/or the system firmware configuration changes corresponding to the selected restore point to boot firmware 162. On the next system boot, boot firmware 162 may restore the system firmware and/or the system firmware configuration settings to the selected restore point (in an alternative step 660).

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. An information handling system (IHS), comprising:
    a computer readable non-volatile memory configured to store system firmware;
    a computer readable storage device configured to store an operating system (OS), a system registry, and an OS restore application; and
    a processing device configured to execute program instructions within the OS restore application to restore the system registry to a selected restore point and reboot the IHS;
    wherein as the IHS is in the process of being rebooted, the processing device is further configured to execute program instructions within a firmware restore application to restore the system firmware to the selected restore point.

2. The information handling system as recited in claim 1, wherein the firmware restore application is included within the operating system stored within the computer readable storage device.

3. The information handling system as recited in claim 1, wherein the firmware restore application is included within a Windows Platform Binary Table (WPBT), which is stored within the computer readable non-volatile memory.

4. The information handling system as recited in claim 1, wherein information about the system firmware is stored within the system registry as firmware registry data, wherein a copy of the firmware registry data is stored within the computer readable storage device, and wherein said information comprises a system firmware version number and a plurality of configuration settings.

5. The information handling system as recited in claim 4, wherein prior to executing the program instructions within the OS restore application, the processing device is configured to execute a first set of program instructions within the firmware restore application to monitor updates made to the system firmware and changes made to the plurality of configuration settings over time.

6. The information handling system as recited in claim 5, wherein the first set of program instructions within the firmware restore application are executed by the processing device to:
    detect updates made to the system firmware and/or changes made to one or more of the configuration settings; and
    update the firmware registry data stored within the system registry and the copy of the firmware registry data stored within the computer readable storage device to include the detected updates and/or changes.

7. The information handling system as recited in claim 6, wherein the first set of program instructions within the firmware restore application are executed by the processing device to detect updates made to the system firmware and/or changes made to the configuration settings by:
    detecting information about the system firmware each time the IHS is powered on or rebooted; and
    comparing the information detected about the system firmware to the information contained within the copy of the firmware registry data stored within the computer readable storage device.

8. The information handling system as recited in claim 4, wherein as the IHS is in the process of being rebooted, the processing device executes a second set of program instructions within the firmware restore application to:
    compare the copy of the firmware registry data stored within the computer readable storage device to firmware registry data contained within the restored system registry to detect changes in the system firmware version number and/or configuration settings.

9. The information handling system as recited in claim 8, wherein if changes in the system firmware version number and/or configuration settings are detected, the processing device executes a third set of program instructions within the firmware restore application to:
  restore the system firmware to the selected restore point by restoring the system firmware and/or configuration settings to the firmware registry data contained within the restored system registry.

10. The information handling system as recited in claim 9, wherein prior to restoring the system firmware to the selected restore point, the processing device executes a fourth set of program instructions within the firmware restore application to provide the option to restore the system firmware or ignore firmware restoration.

11. The information handling system as recited in claim 10, wherein the processing device executes the fourth set of program instructions to:
  display a message prompting a user to choose whether to restore the system firmware or ignore firmware restoration; or
  execute a predetermined policy to restore the system firmware or ignore firmware restoration; or
  restore the system firmware or ignore firmware restoration according to a setup option, which was previously selected to enable or disable firmware restoration.

12. A computer-implemented method performed by a processing device of an information handling system (IHS) to restore system firmware stored within a computer readable non-volatile (NV) memory of the IHS, wherein a computer readable storage device of the IHS stores a system registry containing firmware registry data, which includes a system firmware version number and a plurality of configuration settings, wherein a copy of the firmware registry data is stored within another location of the computer readable storage device, and wherein the method comprises:
  executing a first set of program instructions to update the firmware registry data stored within the system registry and the copy of the firmware registry data stored within the computer readable storage device when changes are made to system firmware; and
  wherein when the system registry is restored to a selected restore point and the IHS is rebooted, the method further comprises executing a second set of program instructions to restore the system firmware to the selected restore point.

13. The method as recited in claim 12, wherein said executing the first set of program instructions includes:
  detecting updates made to the system firmware and/or changes made to one or more of the configuration settings; and
  updating the firmware registry data stored within the system registry and the copy of the firmware registry data stored within the computer readable storage device to include the detected updates and/or changes.

14. The method as recited in claim 13, wherein said detecting updates made to the system firmware and/or changes made to the configuration settings includes:
  detecting information about the system firmware each time the IHS is powered on or rebooted; and
  comparing the detected information about the system firmware to the copy of the firmware registry data stored within the computer readable storage device to detect updates made to the system firmware and/or changes made to the configuration settings.

15. The method as recited in claim 12, wherein as the IHS is in the process of being rebooted, the second set of program instructions are executed to:
  compare the copy of the firmware registry data stored within the computer readable storage device to firmware registry data contained within the restored system registry to detect changes in the system firmware version number and/or configuration settings.

16. The method as recited in claim 15, wherein if changes in the system firmware version number and/or configuration settings are detected, the second set of program instructions are executed to:
  restore the system firmware to the selected restore point by restoring the system firmware and/or configuration settings to the firmware registry data contained within the restored system registry.

17. The method as recited in claim 12, wherein prior to restoring the system firmware to the selected restore point, the method further comprises executing a third set of program instructions to provide the option to restore the system firmware or ignore firmware restoration.

18. The method as recited in claim 17, wherein said executing the third set of program instructions includes displaying a message prompting a user to choose whether to restore the system firmware or ignore firmware restoration.

19. The method as recited in claim 17, wherein said executing the third set of program instructions includes executing a predetermined policy to restore the system firmware or ignore firmware restoration.

20. The method as recited in claim 17, wherein said executing the third set of program instructions includes restoring the system firmware or ignoring firmware restoration according to a setup option, which was previously selected to enable or disable firmware restoration.

* * * * *